United States Patent
Borrelli et al.

[11] Patent Number: 6,158,246
[45] Date of Patent: Dec. 12, 2000

[54] BARRIER FILM FOR HYDROGEN COLORATION IN GLASS

[75] Inventors: Nicholas F. Borrelli, Elmira; Dennis W. Smith; Brent M. Wedding, both of Corning, all of N.Y.

[73] Assignee: Corning Incorporated, Corning, N.Y.

[21] Appl. No.: 09/155,238

[22] PCT Filed: Mar. 25, 1997

[86] PCT No.: PCT/US97/04973

§ 371 Date: Sep. 22, 1998

§ 102(e) Date: Sep. 22, 1998

[87] PCT Pub. No.: WO97/37946

PCT Pub. Date: Oct. 16, 1997

Related U.S. Application Data

[60] Provisional application No. 60/014,853, Apr. 4, 1996.

[51] Int. Cl.[7] .......................... C03C 15/00; C03C 17/00; C03C 25/02; C03B 37/00
[52] U.S. Cl. .......................... 65/30.1; 65/30.11; 65/32.1; 65/32.4; 65/60.1; 65/60.2; 65/60.4; 65/157; 427/126.2; 427/126.3; 427/165
[58] Field of Search .................................. 65/30.1, 30.11, 65/31, 32.1, 32.3, 32.4, 60.1, 60.2, 60.4, 157; 427/126.2, 126.3, 165

[56] References Cited

U.S. PATENT DOCUMENTS

| | | | |
|---|---|---|---|
| 4,086,089 | 4/1978 | Seward, III et al. | 96/27 R |
| 4,155,735 | 5/1979 | Ernsberger | 65/30.1 |
| 4,240,836 | 12/1980 | Borrelli et al. | 106/47 |
| 4,259,406 | 3/1981 | Borrelli | 428/410 |
| 4,290,794 | 9/1981 | Wedding | 65/30.11 |
| 4,304,584 | 12/1981 | Borrelli et al. | 65/30.11 |
| 4,407,891 | 10/1983 | Ernsberger | 428/410 |
| 4,760,307 | 7/1988 | Howorth | 313/371 |
| 4,854,957 | 8/1989 | Borrelli et al. | 65/30.11 |
| 4,989,960 | 2/1991 | Thomas | 350/448 |

FOREIGN PATENT DOCUMENTS

| | | | |
|---|---|---|---|
| 1 459 722 | 12/1976 | United Kingdom. | |
| WO 9735812 | 10/1997 | WIPO | 65/30.11 |

*Primary Examiner*—Stanley S. Silverman
*Assistant Examiner*—Jacqueline A. Ruller
*Attorney, Agent, or Firm*—Angela N. Nwaneri; Vincent T. Kung

[57] ABSTRACT

Method of patterning or forming color gradients and/or designs on a glass surface are disclosed. Patterns are formed by depositing a film of metal on at least one surface of the glass; forming a layer of photoresist over the metal; exposing the article to light through a mask which contains a desired pattern; developing the piece to remove the exposed photoresist to reveal the underlying metal; removing the underlying metal to reveal the underlying glass; and removing the unexposed photoresist to reveal the underlying metal. To form color gradients or color patterns, the glass article is further treated in hydrogen at a temperature in the range of 300–600° C. to effect the desired surface coloration.

12 Claims, 3 Drawing Sheets

BARRIER FILM FOR HYDROGEN COLORATION IN GLASS

This Appln is a International 371 of PCT/US97/04973 filed Mar. 25, 1997 and also claims the benefit of U.S. Provisional No. 60/014853 filed Apr. 4, 1996.

BACKGROUND OF THE INVENTION

Hydrogen firing at elevated temperatures to change the color of glasses whose compositions contain reducible ions is well known. A notable commercial application of that technique is found in the Corning Incorporated eyewear product lines marketed under the SERENGETI® and CPF® trademarks. Another example of the effect of hydrogen firing on color is the formation of a black color on glass, used for STEUBEN® ware or on certain glazed dinnerware products. The color changes induced are attributed to the reduction of a portion of the silver and lead ions, respectively, in the glass to the atomic state.

It is known that a chemical reaction proceeds very fast relative to hydrogen diffusion which leads to the condition of a sharp boundary between the reduced region near the surface, and the unreduced region below the surface. Coloration derives from the reduced layer. Accordingly, it is the object of the present invention to provide a method of forming coloration in desired areas near a glass surface using a barrier film.

SUMMARY OF THE INVENTION

The inventive method would enable the forming of color and color gradients or the generation of designs on the surface of the glass article. The patterns could be of a decorative nature or they could be functional. An example of the latter would be diffraction gratings.

In one aspect, the invention relates to a method of forming color patterns or designs on the surface of a glass article by (1) depositing a hydrogen-blocking film on at least one surface of the glass; (2) forming a layer of photoresist over the hydrogen-blocking film; (3) exposing the glass article to light through a mask which contains a desired pattern or design; (4) developing the photoresist and removing the exposed photoresist to reveal the underlying hydrogen-blocking layer; (5) removing the now exposed hydrogen-blocking layer to reveal the underlying glass; (6) removing the unexposed photoresist to reveal the remaining underlying hydrogen-blocking layer; and (7) subjecting the glass article to hydrogen treatment at appropriate temperature for a duration of time to produce the desired coloration.

In another aspect, the invention relates to a method of forming a color or optical density gradient or designs by depositing a hydrogen-blocking layer having a variable thickness (or thickness gradient), and repeating steps (2) to (7) above, to form a glass having a color or optical density gradient.

In still another aspect, the invention relates to a method of forming coloration in glass by:

(a) providing a glass having an elongated (stretched) reducible phase;
(b) protecting a portion of the glass by selectively forming a thin film of material on the surface of said portion of the glass, the material being capable of retarding or blocking a reducing gas such as hydrogen;
(c) subjecting the unprotected region of the glass to a reducing gas to reduce the reducible phase therein; and
(d) removing the thin film of material from the protected regions to form a glass having a color pattern or design.

As used herein:

"reducing atmosphere" refers to a gaseous atmosphere in which the chemical potential of oxygen is very low. Examples of reducing gases include hydrogen, hydrazine vapor, cracked ammonia, deuterium and forming gas (i.e., a mixture of hydrogen and an inert gas, for example, $H_2/He$ and $H_2/N_2$).

DETAILED DESCRIPTION OF THE INVENTION

Figure 1:
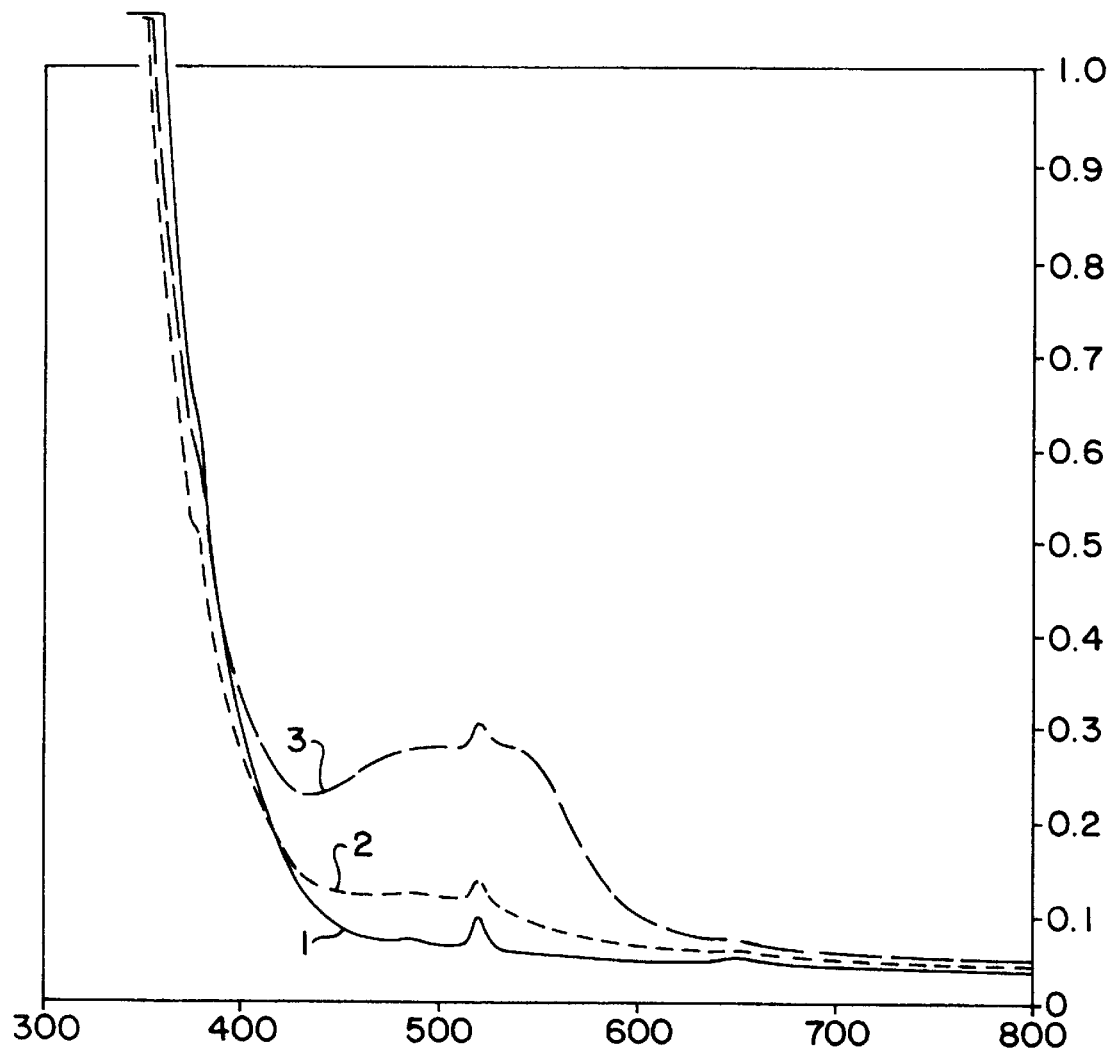
FIG. 1 is a graph comparing the spectra of (1) a photochromic glass with those of (2) the same glass having 2500 Å chromium film after hydrogen treatment at 400° C. for 25 minutes, and (3) the photochromic glass after the same hydrogen treatment, but without the chromium layer.

According to the inventive method, a layer of material capable of blocking a reducing gas is formed on a glass surface, followed by treatment in a reducing atmosphere. For ease of discussion, the layer of material will be referred to herein as "hydrogen-blocking layer" even though it is understood that in addition to hydrogen, other reducing gases such as cracked ammonia, deuterium or forming gas (i.e., a mixture of $H_2$ with He, $N_2$, or Ar) may be used. The hydrogen-blocking layer retards the hydrogen reduction process of the glass below the surface of the layer, enabling the production of color gradients and designs or patterns on the glass.

Any glass containing a reducible phase such as, Ag, Cu, Sb, As, and Pb may be used. Certain phase separated glasses can be used to obtain additional desired effects.

The choice of the blocking material and its deposited thickness is made on the basis of how deep a reduced layer in the glass is required for any given application. In other words, the property of the deposited film, through the combined property of density and thickness, must be sufficient to retard the diffusion of $H_2$ for the time/pressure/temperature required to produce a sufficient reduced depth in the glass, in turn, providing the desired color contrast. For example, the depth to which the silver or copper halide phase is chemically reduced to silver, or copper determines the color of the glass. It has been shown that the reduced depth is proportional to the square root of the $H_2$ pressure and the time of treatment, as well as being an exponential function of the temperature.

In one embodiment, a thin layer of material, preferably a metal such as Al, Cr, Mo, Ta, W, a semiconductor, a metal oxide such as ZnO, or a combination of these, is formed on a glass surface. When the glass is subsequently subjected to hydrogen treatment, the layer retards the hydrogen reduction process, thus enabling the production of color gradients and designs or patterns on the glass. In this embodiment, the coloration is formed by:

1) providing a glass comprising a reducible phase;
2) forming a patterned thin layer of hydrogen-blocking material on the surface of the glass;
3) subjecting the glass to a reducing gas such as hydrogen, to reduce the reducible phase and form coloration in the glass; and 4) removing the thin film blocking layer to produce a glass having colored regions therein. The preferred reducing gas being $H_2$, $D_2$, cracked ammonia, and forming gas. If forming gas is used, then the hydrogen content of the forming gas mixture is preferably at least 0.1%, more preferably, at least 5%, and most preferably, at least 10%. The higher the hydrogen content of the forming gas mixture, the lower the pressure and the less the time required to reduce the reducible phase in the glass.

The thin film blocking layer may be patterned using any suitable method. A particularly useful method of selectively forming the thin film layer is by placing a shadow mask above the glass surface, such that the mask shadows the film deposition, thereby, depositing a patterned thin film layer on the glass through the holes in the shadow mask. The layer can be formed by any suitable method such as by sputtering, thermal evaporation, and chemical vapor deposition. The thickness of the layer may vary depending on the degree of reducing gas retardation required, and also depending on the particular material used. For most applications, we have found that thicknesses in the range of 0.1 to 5 $\mu$m are useful for the inventive methods.

The thin layer of material can be removed by any number of known methods such as dry and wet chemical etching, laser ablation, sand blasting and electron beam technique.

Another useful method of patterning the thin film blocking layer is by using photolithography. In this patterning process, (1) the thin film is deposited over the surface of a reducible glass; (2) a photoresist layer is then applied to the surface of the thin film; (3) the photoresist is lithographically patterned and developed; (4) the patterned photoresist image is then transferred into the thin film layer by an etching process (dry or wet); and (5) the photoresist is removed leaving a patterned thin film blocking layer. If a single-sided color pattern is desired, then a layer of the reducing gas-blocking material can be applied to the other surface of the glass to completely block the reducing gas from reaching the second glass surface. As contemplated by the present invention, a second color pattern of the same or different design from the first, can be formed on the second surface of the glass using the inventive methods. Also, different or the same color patterns can be formed on different regions of the same glass.

In another particularly useful embodiment, a layer of hydrogen-blocking material having a variable thickness (i.e., thickness gradient) is applied on the surface of the glass. The glass is then subjected to hydrogen treatment. The hydrogen reduction process will vary depending on the thickness of the layer. Specifically, the process will be less retarded where the thickness of the layer is thinner than in regions where the film thickness is higher. The result is a glass having a color gradient.

We have found that the particular method used to deposit the thin layer of material is a key aspect of the invention. In particular, to avoid the formation of pinholes in the layer, the film is deposited, preferably in a Class 1000 (or better) clean room environment, by sputtering or other suitable methods.

EXAMPLES

1. In this example, a layer of Cr about 0.2 $\mu$m in thickness, was sputtered onto the glass. This is followed by a photoresist application. The article was then exposed through a mask containing the desired pattern. In the regions of the mask where the photoresist was exposed, the resist was developed and removed to expose the underlying Cr. The chromium in these regions was then etched away to expose the underlying glass. Finally, the unexposed (undeveloped) photoresist was removed to expose the underlying Cr. All of the above steps were carried out in a Class 1000 clean room. The result was glass having the desired pattern of an integral chromium coating.

The sample was then treated in pure hydrogen at temperatures ranging from 400–600° C. depending on the strain point of the glass. The length of time of the hydrogen treatment, as well as the temperature, controls the depth of the reduction.

Following the hydrogen firing, the chromium film was readily removed without affecting the underlying or uncoated glass. The result was a glass article having regions of coloration or design formed by the hydrogen reduction of the exposed glass. The effect of the hydrogen treatment is to form coloration in the regions of the glass exposed by the removal of the overlying metal film.

When the above method is applied to photochromic glasses and treated in hydrogen at 400° C. for 25 minutes, the glasses are substantially clear of reduced silver color in the regions of the glass protected by the Cr. The resulting spectra are shown in FIG. 1. Line 1 is a spectrum of the glass; 2 is the spectrum of the same glass having 2500 A chromium film after hydrogen treatment at 400° C. for 25 minutes, and 3 is the spectrum of the glass after the same hydrogen treatment, but without the chromium layer.

Figure 2A:
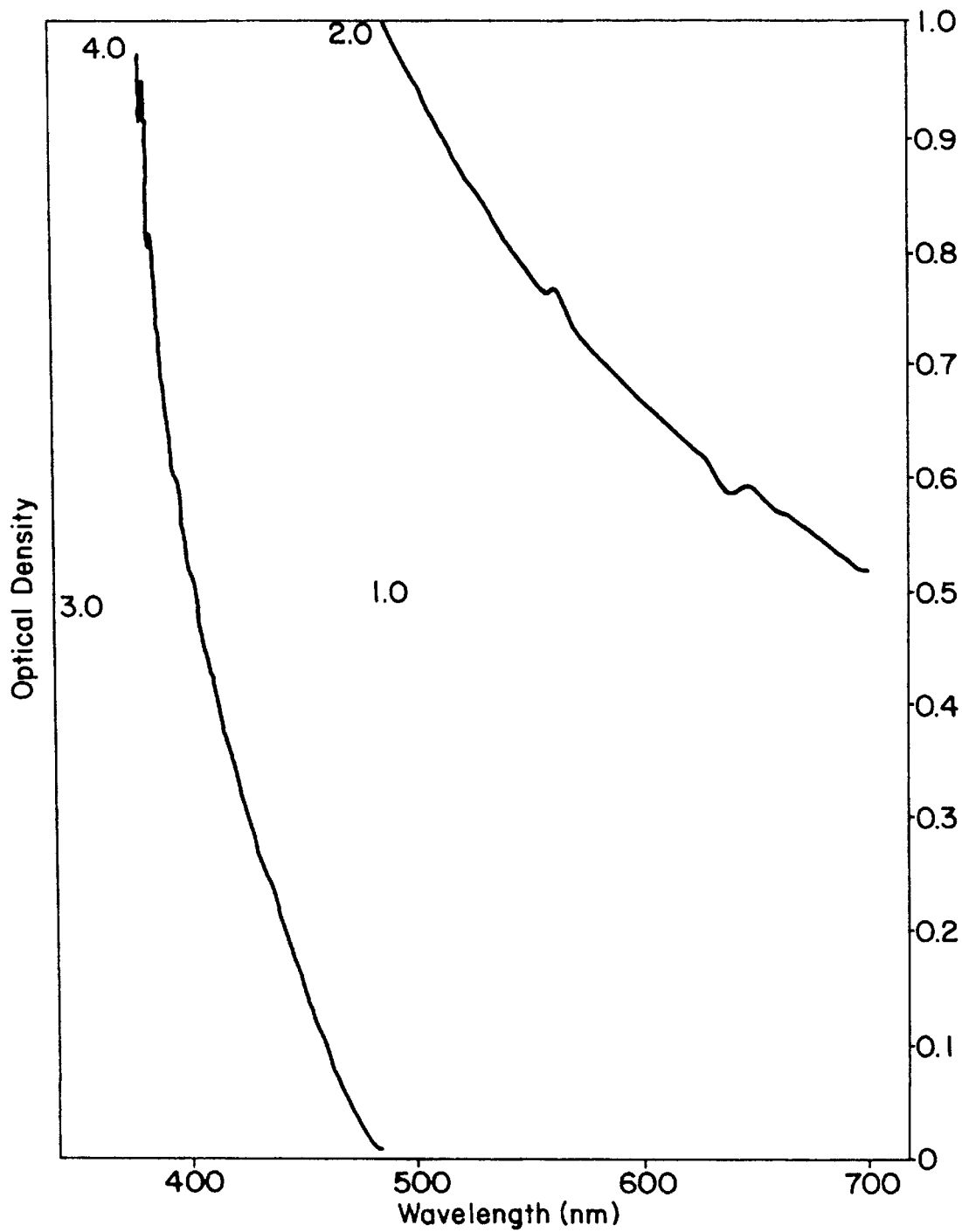
FIG. 2a is a graph of the optical density of a 2 μm thick reduced layer on glass versus the wavelength.
Figure 2B:
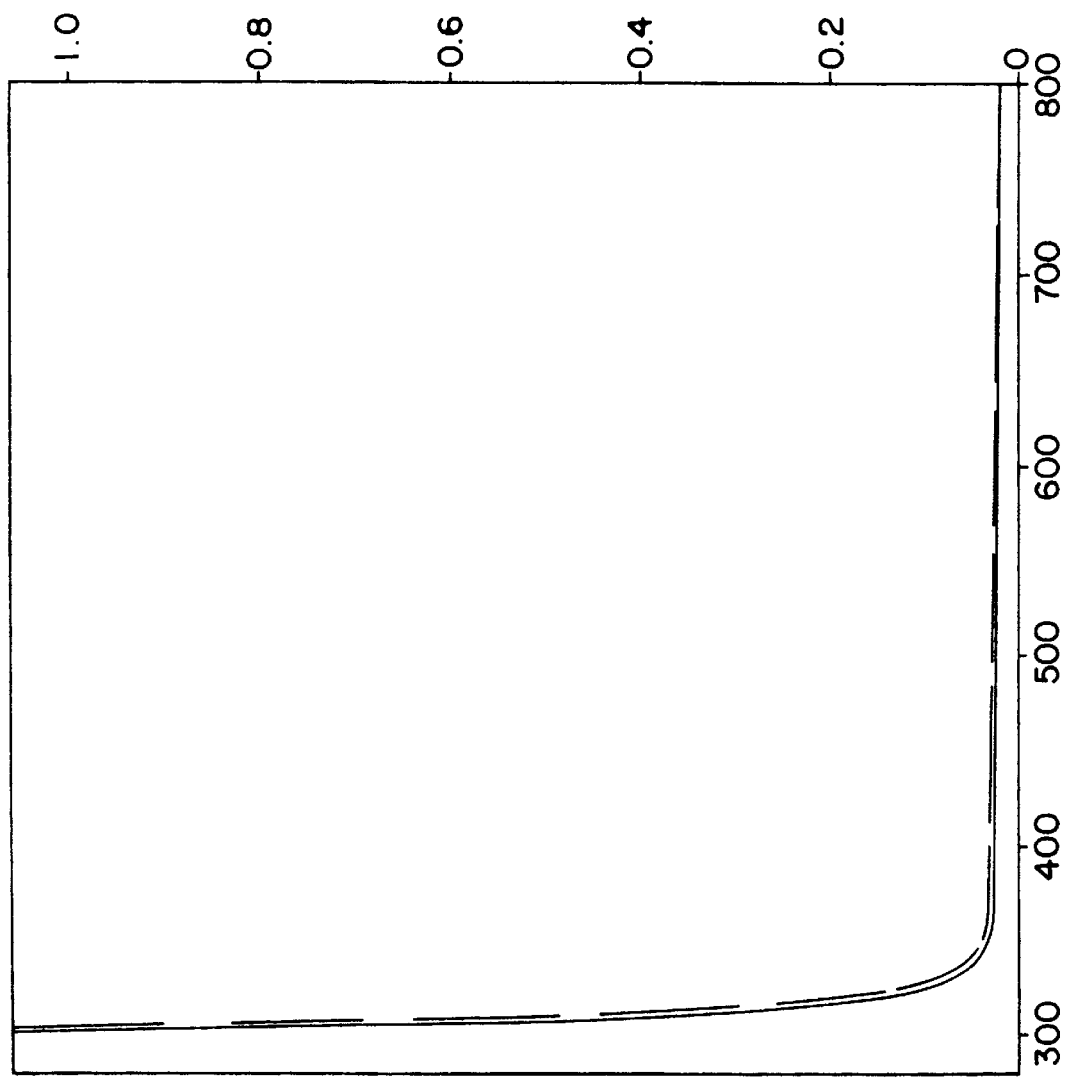
FIG. 2b is a graph of optical density versus wavelength for the chromium-protected regions of the glass of FIG. 2 after hydrogen treatment at 400° C. after 16 hours.

2. In another example, a piece of STEUBEN® glass (available from Corning Incorporated) was fired in hydrogen at 400° C. for 8 hours, with no coloration due to reduced lead observable in the protected region. The depth of the reduced layer in the latter case was only 2 $\mu$m which gave rise to an optical density versus wavelength curve as shown in FIG. 2a. The spectrum of the Cr- protected portion of the glass is compared to the untreated glass in FIG. 2b. The absorption coefficient at 500 nm is $2.3 \times 10^4$ $cm^{-1}$. Analysis of the particles, verified by x-ray diffraction indicates Pb metal forms. In the silver-containing glasses the depths were not measured. However, previous studies of the hydrogen coloration effect in photochromic glasses suggest a thickness of the order of 10 $\mu$m.

The above examples are given by way of illustration only. Other embodiments of the invention which will be clear to persons skilled in the art are also contemplated by the present invention and are embraced within its scope.

What is claimed is:

1. A method of forming coloration on a glass surface comprising the steps of:
   (a) providing a glass having a reducible phase;
   (b) depositing a protective layer of material on at least one surface of said glass, whereby said protective layer is capable of retarding penetration of a reducing gas, and said protective layer is characterized by having a thickness gradient; and
   (c) subjecting said glass to reducing gas treatment at a temperature in a range of 300–600° C., to produce a resultant glass that exhibits gradient coloration.

2. The method of claim 1, wherein said glass has said reducible phase selected from the group consisting of Ag, Cu, Pb, As, and Sb.

3. The method of claim 1, wherein said reducing gas is selected from the group consisting of $H_2$ cracked ammonia, forming gas, and $D_2$.

4. The method of claim 1, wherein said protective layer is formed by a method selected from the group consisting of sputtering, thermal evaporation, and chemical vapor deposition.

5. The method of claim 1, wherein said material is selected from the group consisting of metal, metal oxide, and semiconductor.

6. The method of claim 5, wherein said material is further selected from the group consisting of Al, Cr, Mo, Ta, W, and ZnO.

7. The method of claim 6, wherein said protective layer of material has a thickness in the range of 0.1 to 5 $\mu$m.

8. The method of claim 1, wherein said protective layer of material is deposited onto said glass through holes in a shadow mask.

9. The method of claim 1, further comprising the steps of:
(a) depositing a film of photoresist on the surface of said protective layer;
(b) exposing said photoresist to light radiation through a photomask;
(c) developing and removing said photoresist after exposing to thereby reveal underlying said protective layer; and
(d) removing said protective layer to thereby reveal underlying said glass.

10. The method of claim 9, wherein said photomask is patterned.

11. The method of claim 1, wherein said protective layer has a pre-determined pattern.

12. The method of claim 1, wherein said protective layer is removed by a method selected from the group consisting of dry and wet chemical etching, laser ablation, sand blasting, and electron beam technique.

* * * * *